E. G. LINK.
ADJUSTABLE POT STRAINER.
APPLICATION FILED APR. 19, 1916.
1,214,800.
Patented Feb. 6, 1917.
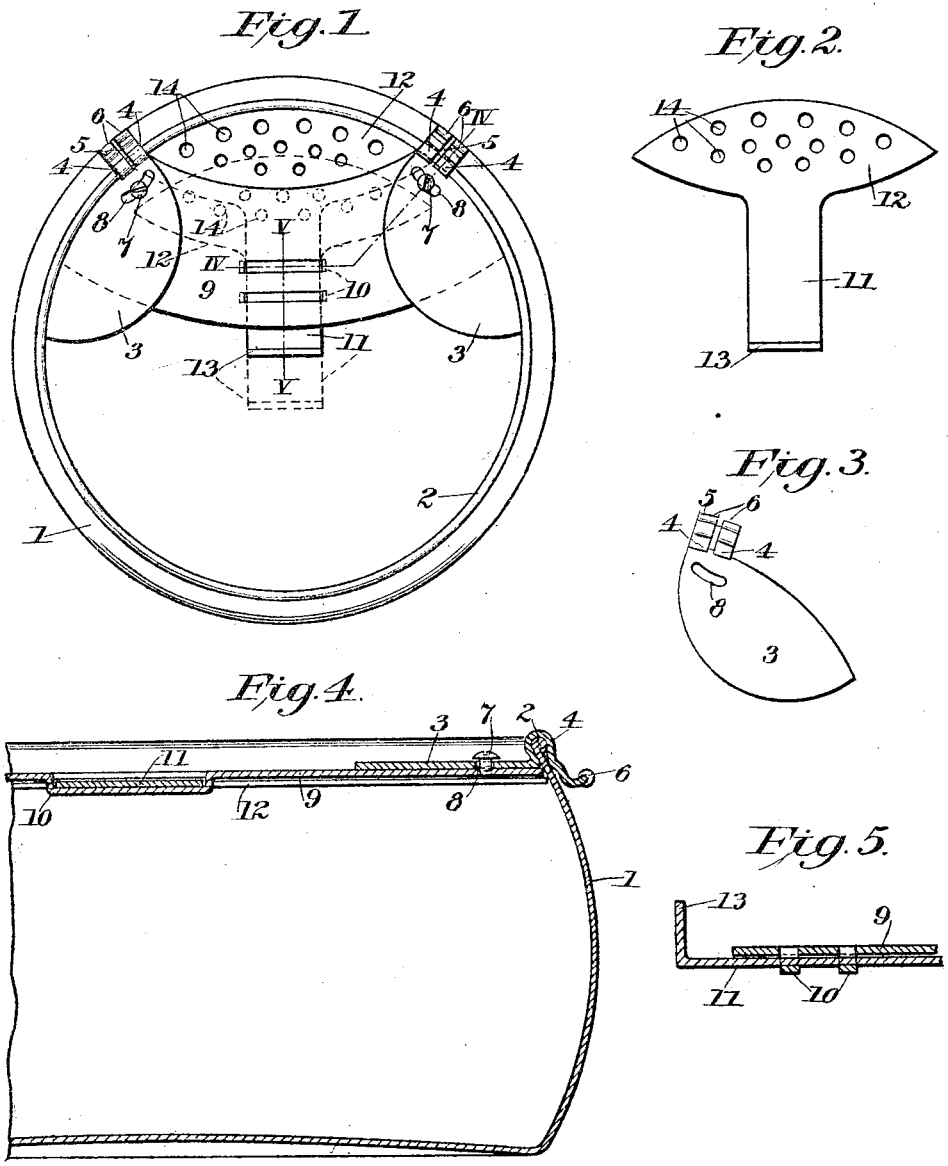

UNITED STATES PATENT OFFICE.

ERNEST G. LINK, OF COLLEGE POINT, NEW YORK, ASSIGNOR TO CHARLES NOSTRAND, OF COLLEGE POINT, NEW YORK.

ADJUSTABLE POT-STRAINER.

1,214,800.　　　　Specification of Letters Patent.　　　Patented Feb. 6, 1917.

Application filed April 19, 1916. Serial No. 92,125.

*To all whom it may concern:*

Be it known that I, ERNEST G. LINK, a citizen of the United States, residing at College Point, in the county of Queens and State of New York, have invented certain new and useful Improvements in Adjustable Pot-Strainers, of which the following is a full, clear, and exact specification.

This invention relates to pot strainers for separating the liquor from cooked vegetables, fruits, and so forth, and has for its object to provide a detachable strainer adapted to fit various sizes of pots and pans.

Another object is to permit the contents of the pot to be poured off after being strained.

The invention will be first hereinafter described in connection with the accompanying drawings, which form a part of this specification, and then more specifically described in the claim at the end of the description.

In the accompanying drawings, wherein similar reference characters are used to designate corresponding parts throughout the several views: Figure 1 is a plan view of the strainer applied to a pot, the retracted position of the straining member, as when the strained contents of the pot is to be poured off, being shown in dotted lines. Fig. 2 is a detailed plan view of the straining member. Fig. 3 is a detailed plan view of one of the adjustable wings which adapts the strainer to fit different sizes of pots and pans. Fig. 4 is a section taken on the line IV—IV of Fig. 1, and Fig. 5 is a section taken on the line V—V of Fig. 1.

Referring more particularly to the drawings, 1 designates a pot or cooking vessel having a beaded rim 2. The strainer comprises an arcuate plate 9 having adjustable wings 3 pivoted at its ends by means of screws 7 passed through slots 8 in said wings. Each of the wings 3 has a pair of resilient clamps 4 adapted to grip the beaded rim 2 of the pot for supporting the strainer in place. Each of the clamps has a wooden tipped handle 6, Figs. 1 and 4, to allow the strainer to be removed without burning the hands. It will be readily understood that by swinging the wings 3 on the pivot 7 the strainer may be adjusted to fit various sizes of pots. A pair of clamps is provided on each of the wings rather than a single clamp, and said clamps are made narrow and separated by a space 5 in order to permit said clamps to yield laterally to accommodate the varying curves of the beaded edges of different sizes of pots. The slots 8 through which the pivot screws 7 are passed are also made arcuate to increase the range of adjustment of the wings.

The middle portion of the plate 9 has a plurality of straps 10 cut and depressed therefrom, and in the straps the shank 11 of the strainer 12 is closely fitted. The end of the shank 11 is bent up to form a handle 13 for moving the strainer back and forth from the position shown in solid lines in Fig. 1 to the position shown in dotted lines in the same figure. The main portion 12 of the strainer is elliptical in form and of a size to cover the space between the plate 9 and the rim of the pot intermediate of the two pairs of clamps 4. This elliptical portion 12 is perforated at 14 so that when in the position shown in solid lines in Fig. 1, it will permit the liquor to pass off while retaining the solid contents of the pot. After having been drained in this way, the strainer 12 may be withdrawn to the position indicated in the dotted lines in Fig. 1 and the solid contents of the pot poured out through the open space between the plate 9 and that portion of the rim of the pot intermediate of the pairs of clamps 4.

Having thus described my invention, what I claim as new and desire to secure by Letters Patent of the United States is:

A pot strainer comprising a plate to extend across a pot and leave a pouring opening between one edge of the plate and the adjacent portion of the rim of the pot, adjustable wings at the ends of the plate to fit pots of different sizes, means for detachably fastening the wings to the rim of the pot, and a straining member having a perforated portion to fit over the pouring opening, and a shank portion slidably connected to the plate for the purpose specified.

In testimony whereof I have signed my name to this specification.

ERNEST G. LINK.

Copies of this patent may be obtained for five cents each, by addressing the "Commissioner of Patents, Washington, D. C."